Nov. 19, 1957   R. M. M. OBERMAN   2,813,929
AUTOMATIC SIGNALLING SYSTEM
Filed Oct. 24, 1952   13 Sheets-Sheet 7

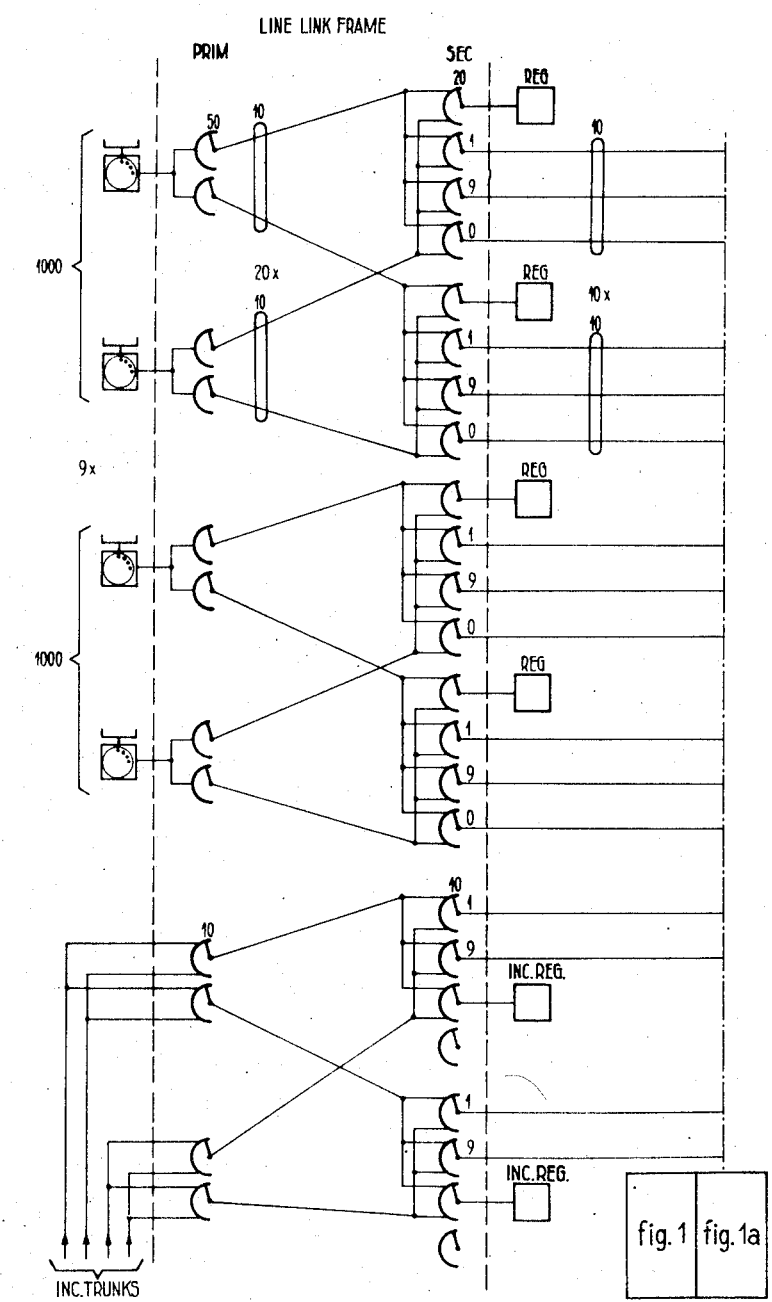

INVENTOR.
R.M.M. OBERMAN
BY HUGH A. KIRK
ATTORNEY.

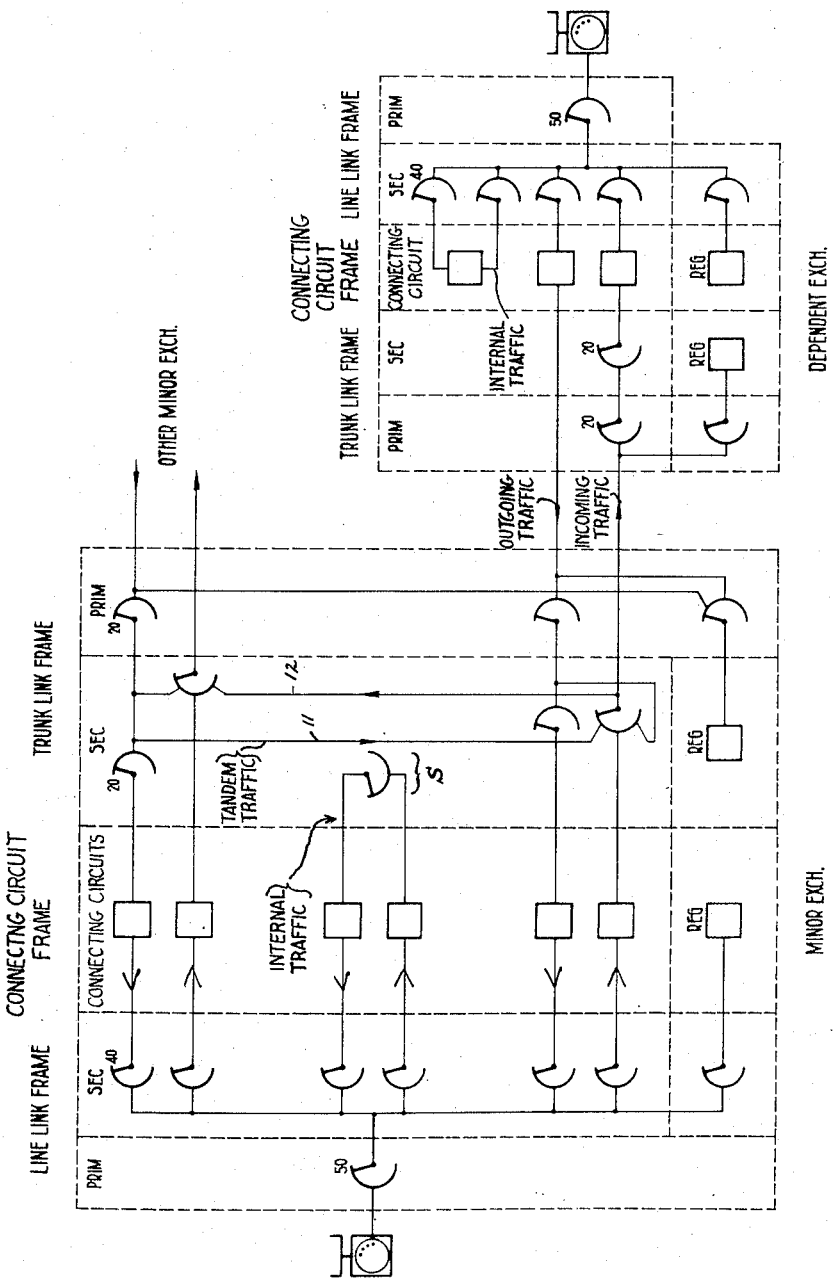

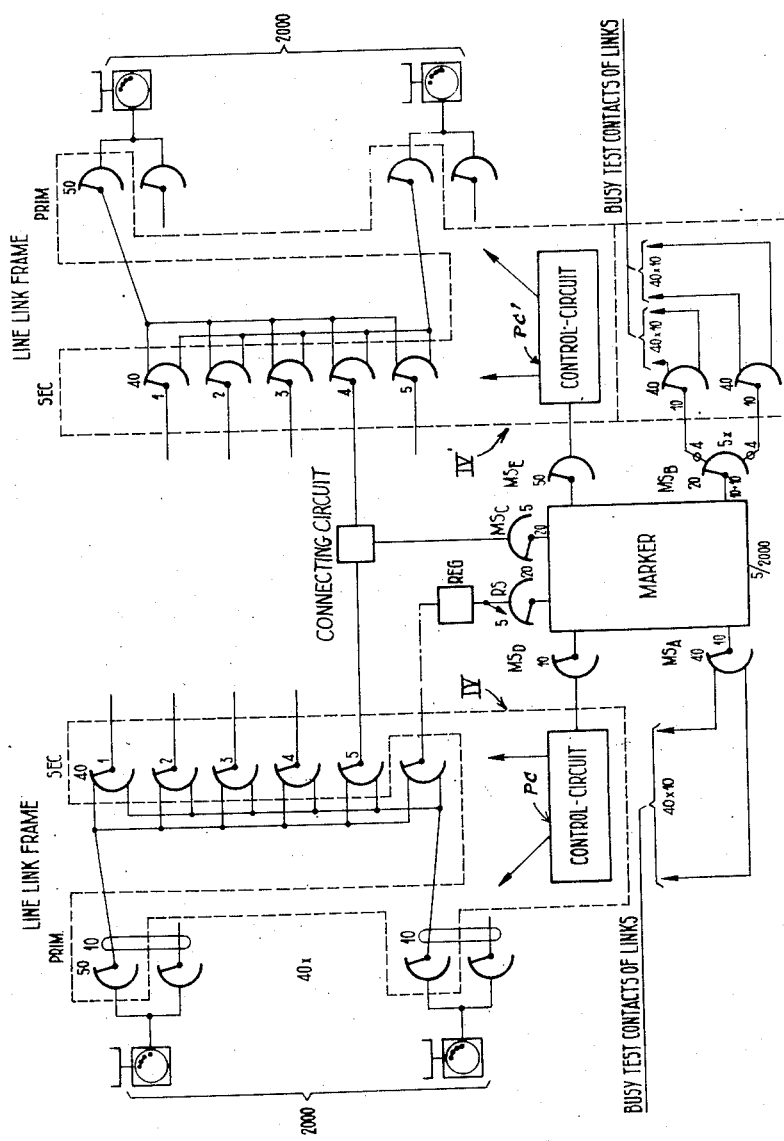

United States Patent Office 2,813,929
Patented Nov. 19, 1957

2,813,929

AUTOMATIC SIGNALLING SYSTEM

Roelof Maarten Marie Oberman, The Hague, Netherlands, assignor to De Staat der Nederlanden, Ten Deze Vertegenwoordigd Door de Directeur-Generaal der Posterijen, Telegrafie en Telefonie, The Hague, Netherlands Application October 24, 1952, Serial No. 316,574

13 Claims. (Cl. 179—18)

The present invention refers to an automatic signalling system, preferably an automatic telegraph and telephone system, in which the connections are established in one exchange under the control of devices which control the connecting devices between the successive switching stages in a detour or bypass connection around these switching stages.

Such systems are known with crossbar switches in the selecting stages. The Bell Laboratories Record, vol. 17, contains a number of extensive descriptions of the crossbar system developed in the Bell Telephone Laboratories, which system was later called the Western Electric Company No. 1 crossbar system. The article "Crossbar trunking" written by L. E. Kittredge in the beforesaid Record is of importance with regard to the invention. From this system the Bell Laboratories have developed the simplified Western Electric Company crossbar system No. 5, described in several articles in the 1950 Bell Laboratories Record. Furthermore, similar systems containing hundred-outlet and two hundred-outlet switches have been described in U. S. application Serial No. 230,277, now Oberman Patent No. 2,741,663.

As to the system with crossbar rods, it is an objection that a fairly large number of switching stages are required to establish a local connection. The published switching diagram of the Western Electric Co. No. 1 crossbar system of the so-called "district and office-link-frames" for the effecting of the central indication of the subscriber's number to be dialled, as used in the big American towns for the actual four-digit subscriber's number, contains a so-called "line-link-frame" with two switches (primary and secondary), a so-called "incoming link-frame" (also with primary and secondary switches), and another line-link-frame.

These frames are controlled by a small number of markers placed in a central position.

Based on the principles of this system, the so-called No. 5 crossbar system has been developed specially for four-digit local systems. A local connection in this system successively contains a line-link-frame, a trunk-line-frame, and a link-line-frame. From the point of view of numbers of switches in a local connection, the system No. 5 is a step backward as compared with the No. 1 system.

Furthermore it should be remarked here that the crossbar systems of the Swedish Telegraph and Telephone Services (Tele 1950, No. 2) and of L. M. Ericsson (Ericsson Review 1950, No. 4) are not controlled by a central device controlling the connecting links between all the selecting stages simultaneously. These system contain 4 switching stages for 4 digits, each stage consisting of a primary and a secondary switch. Besides these systems equipped with crossbar switches, systems with 100- (or 200-) outlet selectors can be designed, see U. S. application Serial No. 300,806, now Oberman Patent No. 2,711,444, in which each register functions as the device which controls all the connecting links between the selecting stages, the result being that the switching diagram of a four-digit system contains two selecting stages instead of three as in the usual systems with these switches.

The system according to the invention, which will preferably be applied to systems with crossbar switches, but which can also be used in electronic switching systems in which matrices with rectifying cells act as selectors just as in systems with all the other sorts of rotary selectors etc., makes it possible to reduce the switching diagram of an independent exchange with 9000 (or 10,000) subscribers and an outlet via the "0" in a four-digit system to only the switches installed in a line-link-frame, further to be called subscriber's line-link-frame.

Such a frame contains primary switches to which the subscriber's lines have been connected and two groups of secondary switches, one group serving for the outgoing and the other group serving for the incoming traffic of the subscribers.

The possibility of mutually through-connecting 9000 (or 10,000) subscribers with a sufficient number of routes and an admissible blocking chance by means of such a small number of switches, which moreover have only a slight number of positions, is obtained by applying a central control device, which, after the required subscriber's number has been dialled, selects three free switching links which are mutually reachable and which are effectuated between calling and called subscriber and not between a connecting circuit and a called or calling subscriber as in the No. 1 and No. 5 Western Electric crossbar systems. This implies a reduced number of switches required and a simplified control of the automatic devices.

The given principle can easily be extended to exchanges or networks of exchanges with a capacity exceeding 10,000 subscribers or to toll exchanges.

The invention will be elucidated by means of some diagrams showing the circuits to such an extent as is necessary for a good understanding. So these diagrams do not show the circuits known from other systems in order to reach a certain effect, as e. g. the testing of three groups of ten connecting links and the selecting together of three free mutually reachable links (see e. g. the article by Kittredge referred to above).

Figs. 1 and 1a shows the principle of a switching diagram for a system with four digits.

Figs. 2 and 2a shows an improvement of the switching diagram Figs. 1 and 1a.

Figs. 3, 3a, 3b and 3c give an example of the switching diagram of an exchange of a six-digit system.

Fig. 4 shows the co-operation between Figs. 2 and 2a and Figs. 3, 3a, 3b and 3c.

Fig. 5 gives the principle of the markers and the positioning circuits as required for the switching diagram of this invention.

Figure 6:
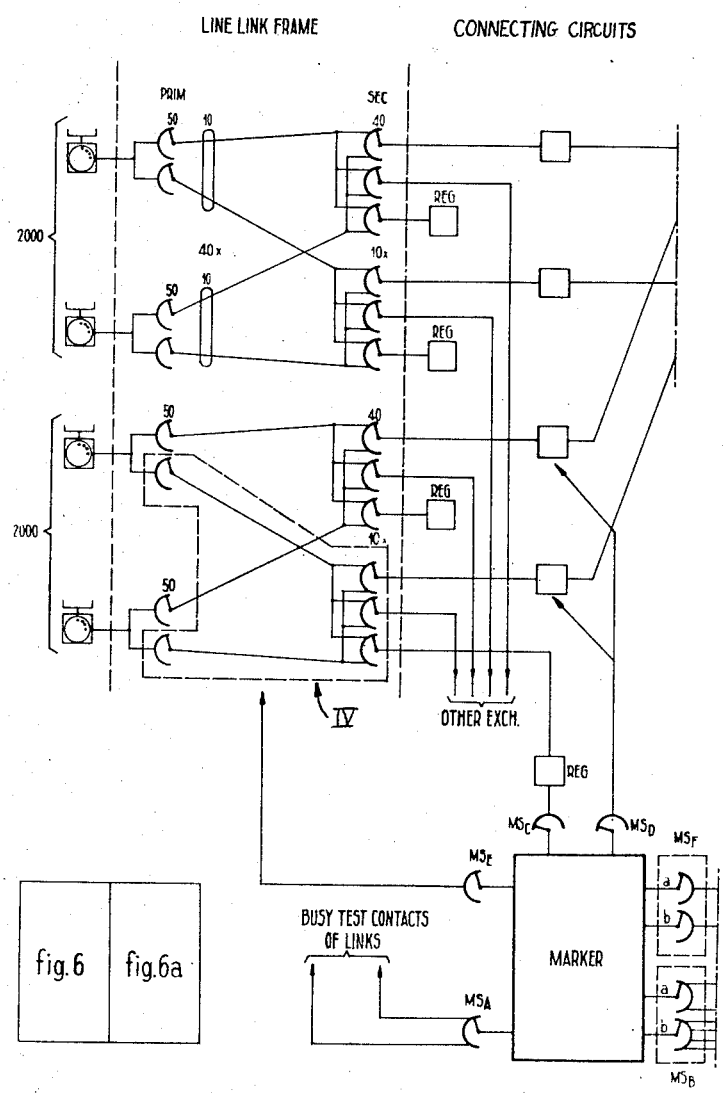
Figure 6A:
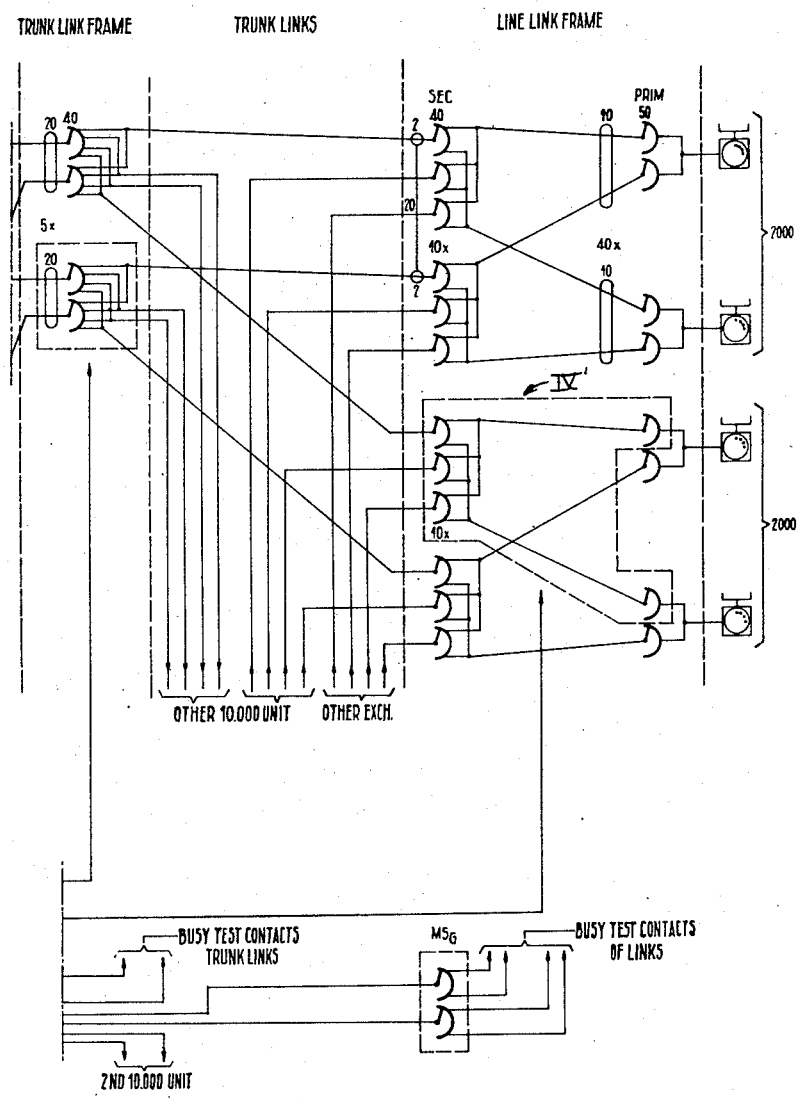

Figs. 6 and 6a gives a diagram similar to Fig. 5 for a 5 or 6-digit system.

Figure 7:
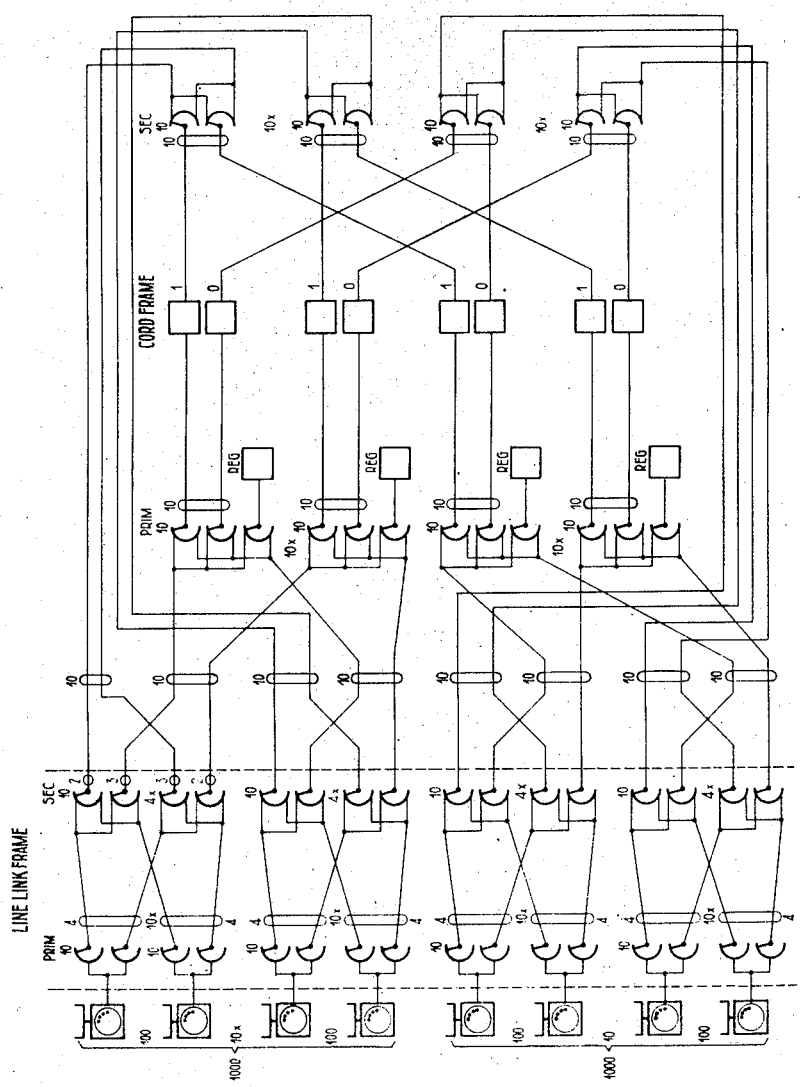

Fig. 7 shows a switching diagram according to Figs. 1 and 1a and Figs. 2 and 2a in which all of the subscribers are shown connected to the same line link frame and employing smaller switching units of a cross bar switch.

Figure 1A:
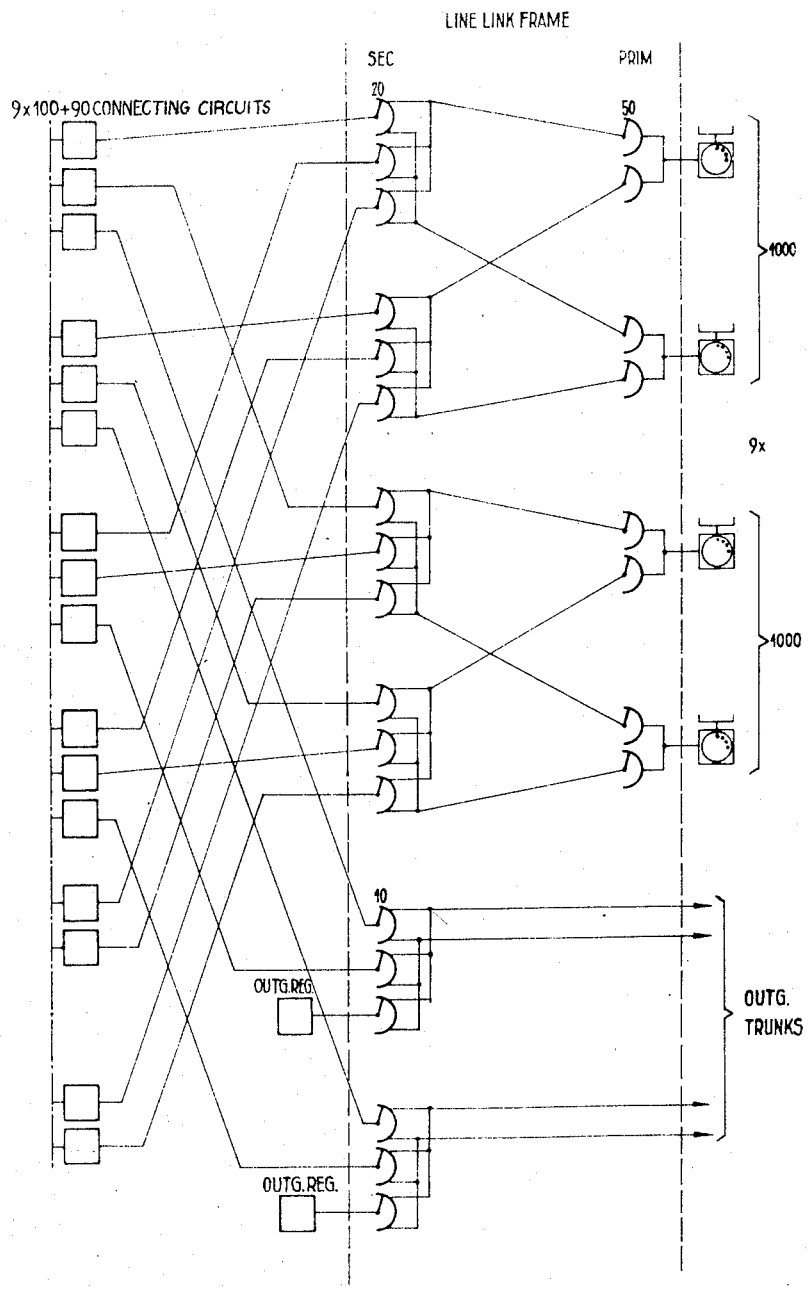

As a first example demonstrating only the general principle, the diagram of Figs. 1 and 1a is given. It represents a general switching diagram of an exchange with a maximum of 9000 subscribers in a four-digit system having an outlet via the "0." It is only constructed of subscriber's line-link-frames. The primary switches PRIM, e. g. all of them, consist of 50 vertical units or input terminals with 10 positions or links, just like the crossbar switch of American design.

Thus a decimal system can be obtained. The 50 subscribers who are conencted by means of it, get, together for their outgoing and incoming traffic, 10 outlets ($p$ (blocking probability) =0.01, 3.1 T. U. (traffic units)) which seems generally to be amply sufficient.

Twenty of these groups of 50 subscribers are distributed systematically over a group of secondary switches SEC of the subscriber's line-link-frame containing the splitting up of outgoing and incoming traffic. Per group of 1000 subscribers there are 10 groups of secondary switches, each containing 10 switches for outgoing and 10 switches for incoming traffic, each switch having 20 positions (i. e. occupying 2 vertical units of an American crossbar switch).

There are 9 of these groups of 1000 subscribers, while a 10th link-frame is destined to trunk lines outgoing and incoming via "0." So each group of 1000 subscribers disposes of 100 connecting circuits. The group of incoming lines also corresponds with a group of a maximum of 100 connecting circuits. The outgoing sides of these circuits are distributed by additional links, namely said connecting circuits regularly over the inputs of the secondary incoming switches of the subscriber's line-link-frame. Each group of these incoming secondary switches of the subscriber's line-link-frame has been through-connected to a group of secondary switches handling the outgoing traffic.

The connecting line links which have been drawn in Fig. 1 between the incoming secondary switches and the primary switches of this frame are the same as those in Fig. 1a between the primary switches and the outgoing secondary switches i. e. the line link frame in Fig. 1a is the same as the line link frame in Fig. 1 (see also Fig. 7).

The regular distribution of the right hand sides of the connecting circuits over the incoming secondary switches implies that out of each group of ten, one of such groups has been connected to each group of switches leading up to a certain 1000, while of the 100 connecting circuits 10 out of each thousand have been connected to the incoming (or outgoing) secondary switches of each other thousand.

So the situation on the secondary switches of a subscriber's line-link-frame is as follows: On the one side there have been connected 20 groups of 10 connecting links to the primary switches PRIM, and on the other side there have been connected the outgoing and the incoming sides of the connecting circuits, which in their turn have been subdivided into 2 x 10 groups, each with 10 connecting circuits.

In principle the functioning of the diagram according to Figs. 1 and 1a is as follows: A calling subscriber is connected to a register REG, ten of which have e. g. been provided per 1000 subscribers, one for each group of 10 x 10 or 100. This number may be fixed higher or lower. The registers have been connected to the secondary switches of the subscriber's line-link-frame. If required further concentration stages may be inserted.

After the four digits of the required subscriber's number have been dialled, a non-indicated marker is seized, which marker (see Figs. 5 and 6) seizes three free and mutually reachable links, and positions the required connection, i. e. the incoming and outgoing links for a connection to be set up through the line link frame between primary and secondary switches, and the connecting circuit connecting an incoming secondary switch with an outgoing secondary switch.

Each subscriber can always be connected to any other subscriber via 10 different routes. In this manner an automatic exchange according to the switching diagram of Figs. 1 and 1a, would be equipped with 900 connecting circuits plus a maximum of e. g. 90 incoming connecting or trunk circuits, whereas if the conecting circuits could be considered as a perfect group, only about 400 would be required for the traffic considered.

So for an exchange of 10,000 subscribers equipped with cross-bar switches, the switching diagram of Figs. 1 and 1a gives a minimum quantity of switching apparatus for a relatively large number of connecting circuits which justifies the question whether it would be possible to decrease the number of connecting circuits.

Before going into this question the attention should be drawn to the fact that in the diagram of Figs. 1 and 1a a numerical selection is actually already made before the connection of the circuit, i. e. by the selection of the secondary (concentration) switch and the connecting circuit over which the connection will be established. It is possible to decrease the number of connecting circuits by combining the connecting circuits into larger groups, so that through a smaller splitting up in consequence of the numerical division of the connecting circuits there will be larger groups.

Figure 2:
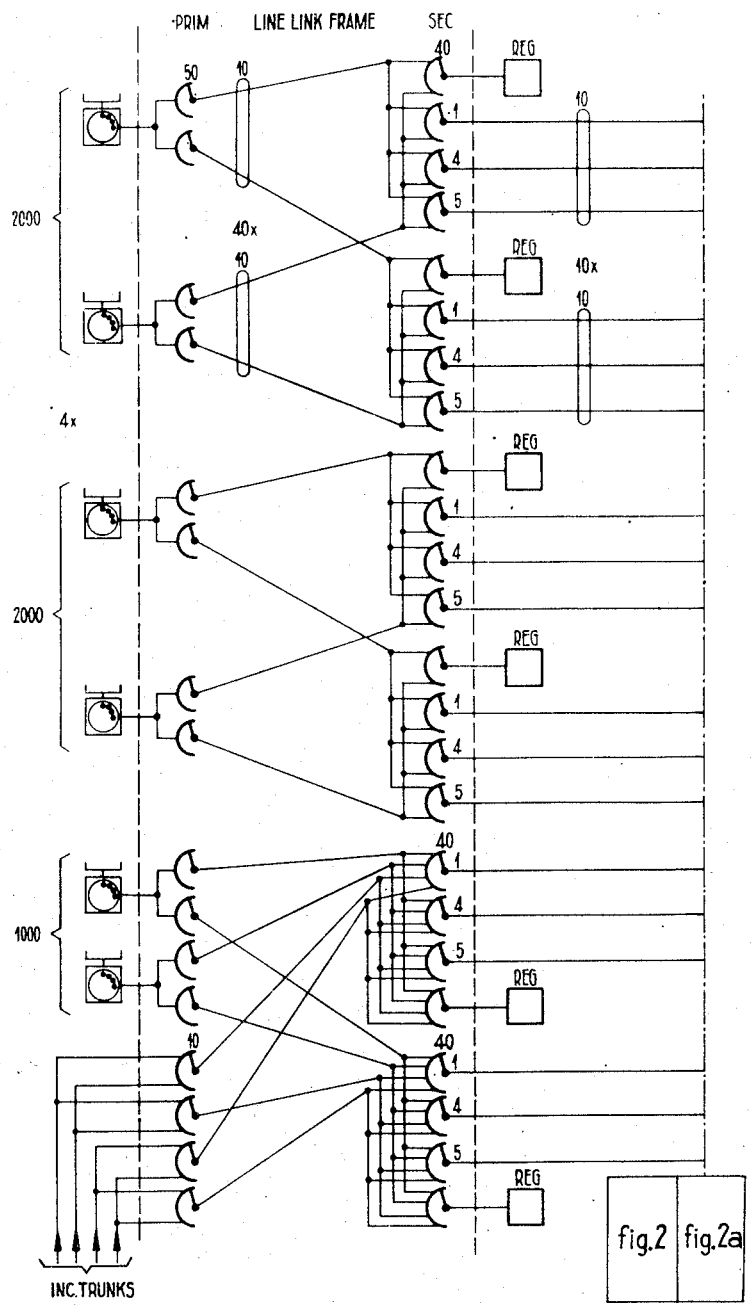
Figure 2A:
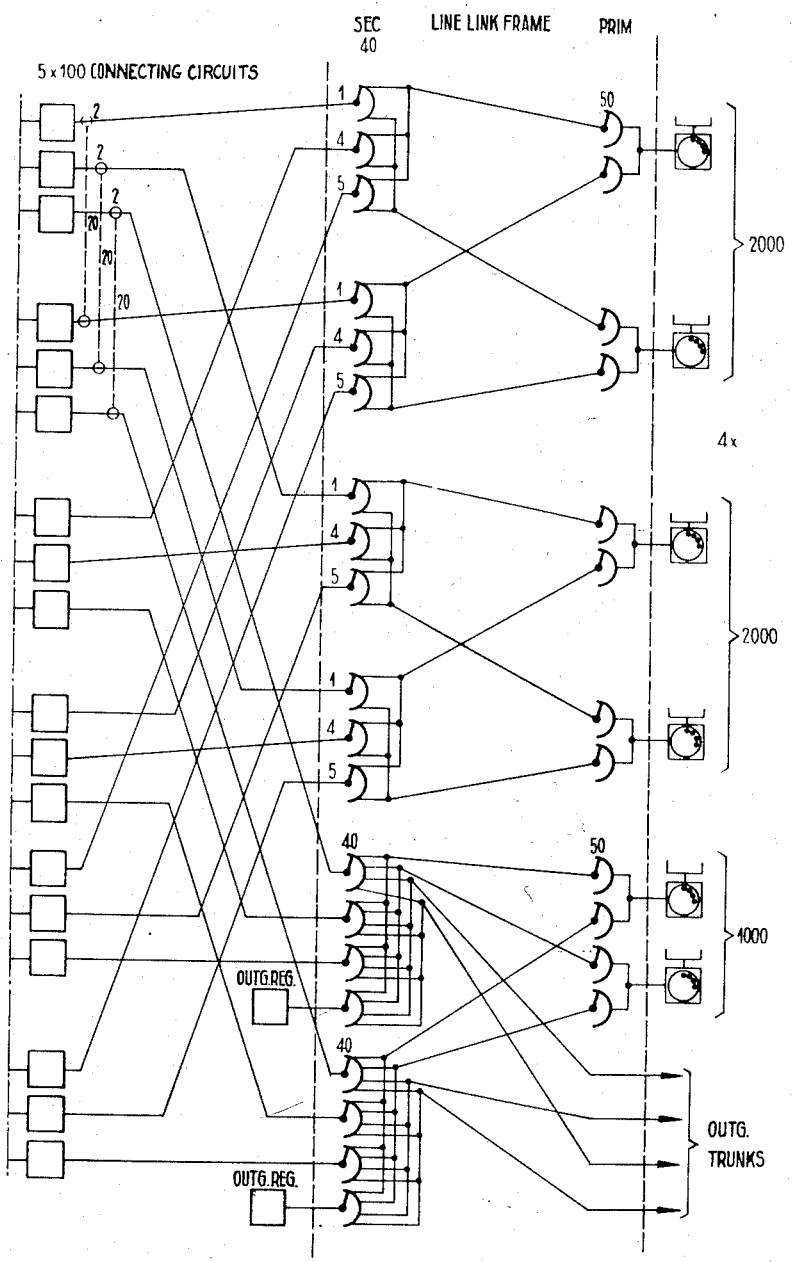

In principle it is possible to combine two 1000-groups into one 2000-group. Then the secondary switches in the subscriber's line-link-frame get 40 positions, and then there will be 4½ times such groups of 2000 subscribers. Furthermore each group of 2000 subscribers has 40 groups with 10 connecting links, which in connection with the division in tens would have to correspond with 2 x 5 groups of 20 connecting circuits (Figs. 2 and 2a). If again the traffic with 50 subscribers which is handled over the 10 links, is taken to be 3 T. U. (traffic units) ($p$ (blocking probability)=0.001), a group of 2000 subscribers supplies about 120 T. U. (traffic units), which must also be handled by the 2 x 5 groups of connecting circuits, which with a somewhat increased blocking chance is possible and admissible.

A division of the exchange into 4 groups of 2500, inclusive of the group of the "0" traffic, would split up the connecting circuits into 2 x 4 groups. Each group of 2500 subscribers yields a traffic of about 150 T. U., and then each group of connecting circuits must contain about 30 circuits.

With this division the secondary switches of the subscriber's line-link-frame obtain 50 positions, just like the primary switches.

It should be remarked that if a heavy outgoing traffic over the "0" numbered switch and connection would have to be expected, it is without further measures possible to increase the number of connecting circuits leading up to the switches which have access to the outgoing lines, to e. g. 40 or more. It seems that the switching diagram of Figs. 2 and 2a with the numbers contained in it, gives a reasonable decrease of the number of connecting circuits (i. e. a decrease of about half) without the required switching material being inadmissibly increased.

Figs. 3, 3a, 3b and 3c show a switching diagram for a six-digit system. This system must e. g. serve a complete mesh-shaped network between a number of exchanges with busy traffic, to which exchanges of the outskirts of this big town network have been connected in a star-shaped manner. The first digit indicates the star group or minor exchange, the second digit determines the exchange, while the other four digits determine the number in the relevant ten thousand-unit in that exchange. So the exchange in the star-point has incoming lines and outgoing lines on 2 levels, i. e. those from and to other star-point exchanges and those from and to its own end or dependent exchanges. The traffic from these end exchanges can be handled wholly or partially via a tandem exchange of the star-exchange. An example of such a star-exchange developed within this scope is given in Figs. 3, 3a, 3b and 3c. This example is based on the fundamental form with 50-points primary and 40-points secondary switches in the subscriber's line-link-frame as given in Figs. 2 and 2a. The subscribers have been arranged in five two-thousands groups, each with e. g. 100 connecting circuits.

The connecting circuits have been divided in 3 groups in accordance with the main routes of the traffic, i. e. the group of the local, internal or own 10,000-unit, the one to the other, 10,000-units of the same star-group or minor exchange, and the group to the other star-exchanges i. e. outgoing. Such a division of the connecting circuits in three groups, viz. one smaller group for the internal traffic of the local ten-thousand, one for the traffic of this ten thousand with other star groups, and one for the traffic of the ten-thousand with other ten-thousands belonging to said local group, is admissible from the point of view of traffic technique. The outgoing side of the connecting circuit is connected to a switching stage (trunk-link-frame with only secondary switches), which can give through-connection to the required 2000, only one of which frames I has been shown in this diagram in Figs. 3, 3a, 3b and 3c. The input switches and the output switches of the subscriber's line-link-frame of each 2000 have been connected in multiple in corresponding groups. The two groups of connecting circuits which lead up to the outgoing trunks, both to the higher switching level (group centres or minor exchanges) and to the lower switching level (end or dependent exchanges or satellites), are also led over secondary switches of a trunk-link-frame II, in which splitting up of the outgoing traffic to $n$ star-points and $m$ end exchanges takes place (see Fig. 3a). By way of example 200 outgoing lines in total have been provided for both switching levels, which lines can be reached from the local ten-thousand-unit.

In principle it is not necessary to discriminate as to the origin of the incoming lines. As a matter of fact an incoming line from another group exchange can have traffic for the local exchange belonging to its group, but this traffic can also be destined for the end exchanges of said group. Then this traffic is tandem or through traffic to the lower level. It can, however, also be necessary to apply detour or tandem traffic on the level of the group exchange. So there must also be a possibility to through-connect again an incoming connection from an exchange of said group to an outgoing trunk line to such an exchange. It must also be possible to through-connect the trunk lines incoming from the end exchanges with the three main possibilities described before. To this end the following possibilities are given by the switching diagram of Figs. 3b and 3c. Each incoming trunk line (in the example 2 x 400 lines, see the lower part of Figs. 3 and 3a and all of Figs. 3b and 3c) is connected e. g. to an arc of a 20-points primary switch, twenty of which switches have their corresponding contacts multipled together. Twenty of these groups of primary switches PRIM of the incoming trunk-line-link-frame (see Fig. 3b) have been connected with secondary switches SEC with an equal number of positions, together in a well-known manner giving access to 400 outlets.

On these secondary switches splitting up takes place of the traffic for 5 local 2000-groups as well as for the various group exchanges and end exchanges. If the number of each of these groups is not too large (5 to 6), it is not necessary to apply a following switching stage. Apparently it is recommendable not to couple the outgoing (or passing) lines of the tandem exchange with the outgoing lines of the local exchange. Accordingly markers can be used more or less freely because separate markers can be used for local originating traffic and through traffic.

Figure 3:
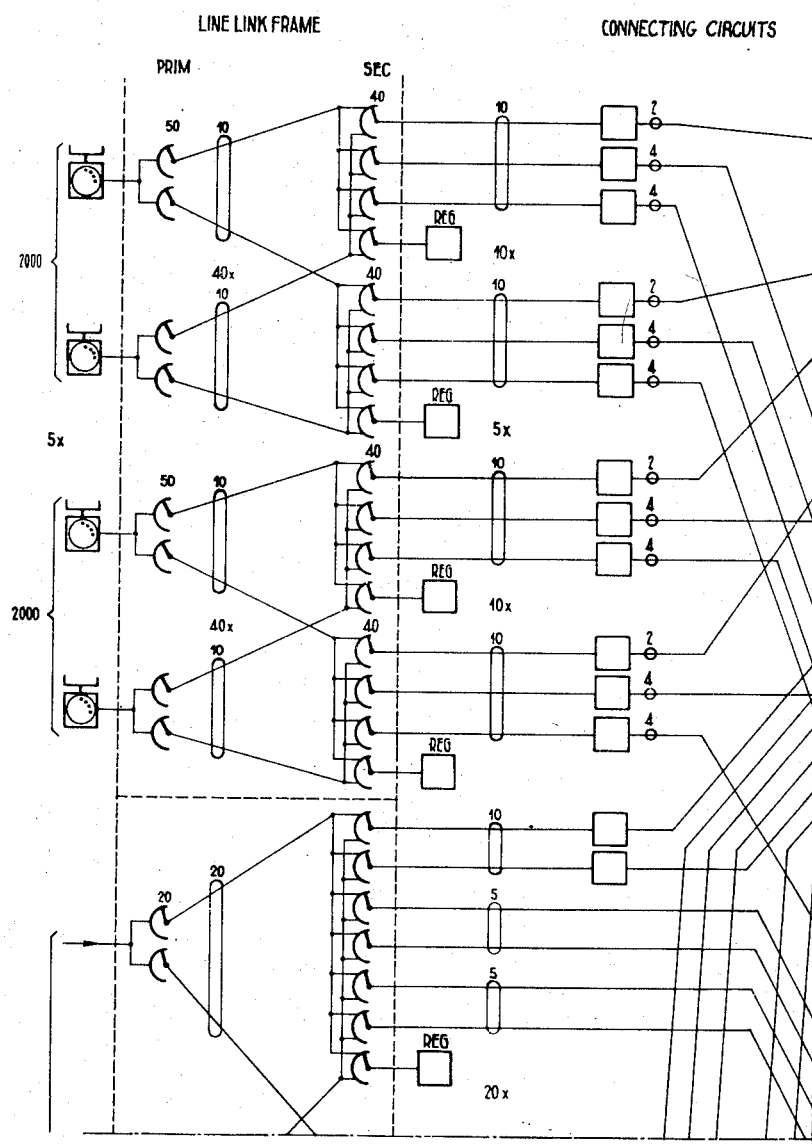
Figure 3A:
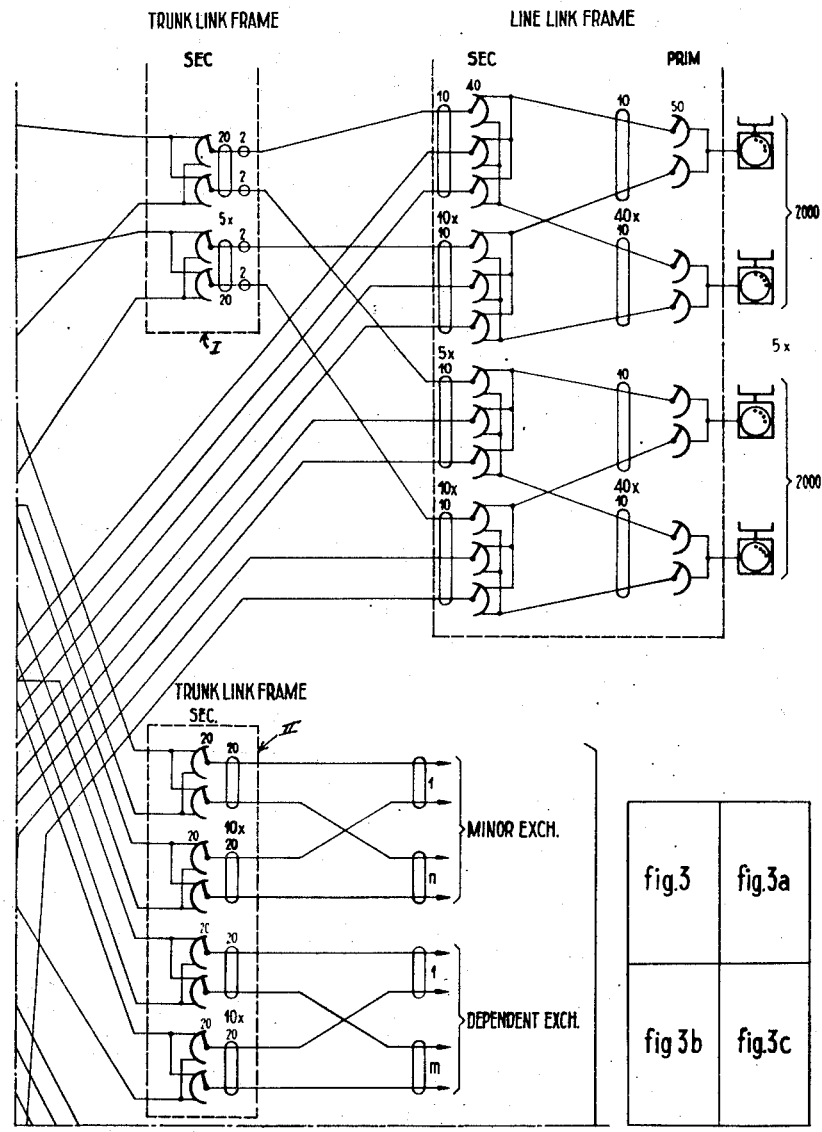
Figure 3B:
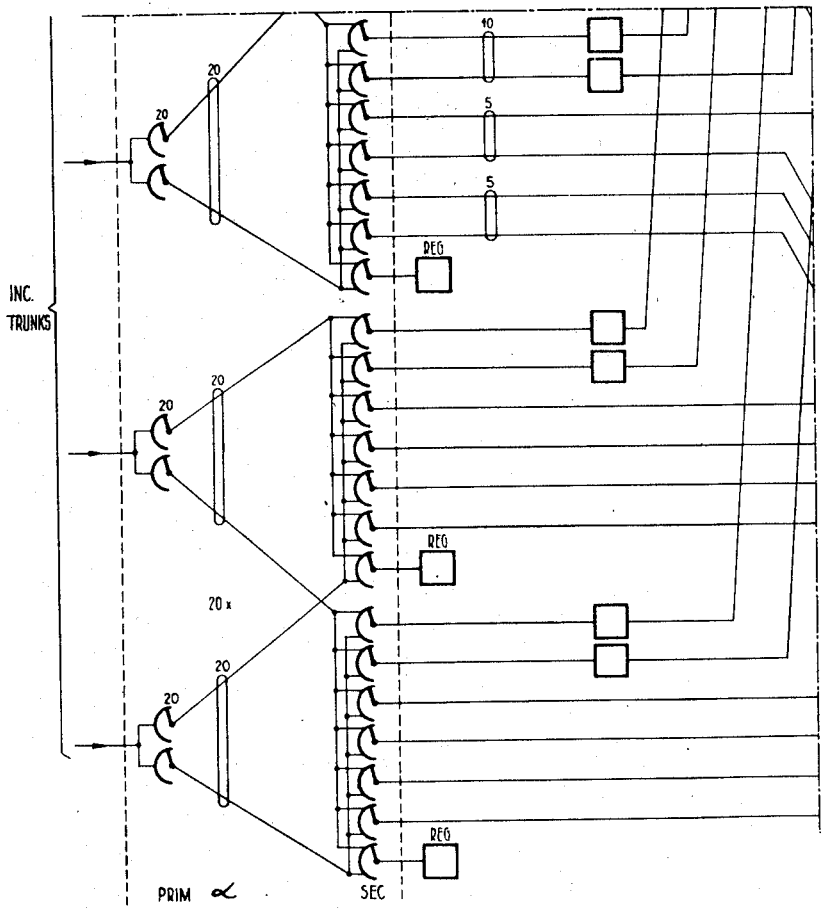
Figure 3C:
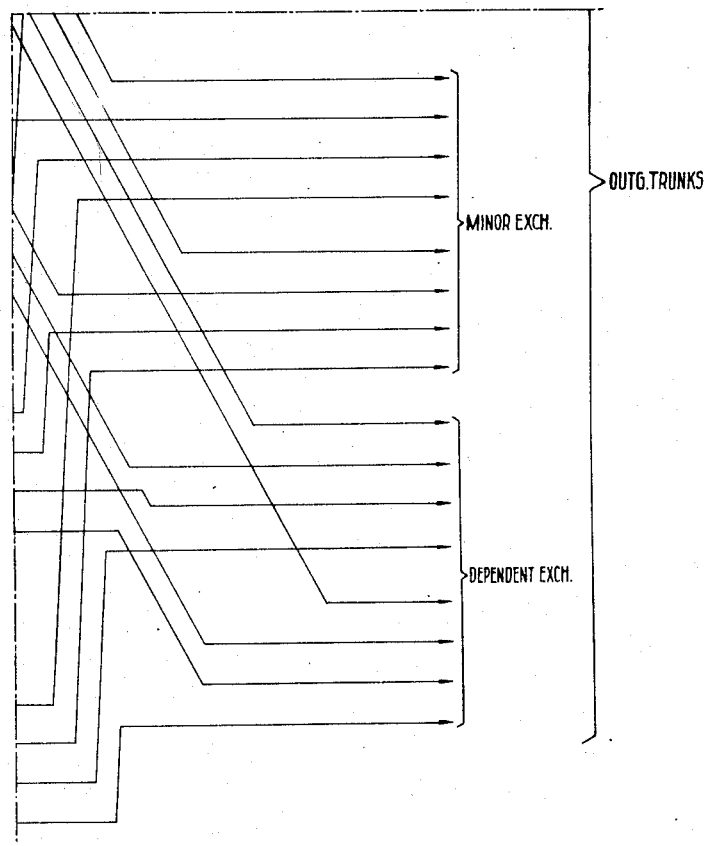

If the star- or group exchange contains more than two or three local 10,000-units, it can be necessary to insert a half link-frame such as I or II in Fig. 3a (i. e. only has secondary switches and no primary switches) between the secondary switches of the trunk-line-frame $\alpha$ of the incoming lines.

Fig. 4 symbolically shows the diagram of a group exchange with an end exchange connected to it. The switching diagram of Figs. 2 and 2a (omitting the switch between the outgoing side of the connecting circuit and the outgoing lines) has been represented together with Figs. 3, 3a, 3b and 3c symbolically in Fig. 4. The end or sub-exchange has internal traffic via a subscriber's line-link-frame with primary and secondary switches. The outgoing traffic passes only one link-frame, which is admissible with busy traffic in the direction of the star-center or minor exchange, which as a rule is the case in such an exchange.

With the given switches, the incoming traffic must be handled over two link-frames, each with a primary and a secondary switching stage. Registers can be connected with it in the usual manner.

For the internal traffic the star or group exchange contains one switching stage more than the sub-exchange, i. e. a secondary switching stages in the trunk line-link-frame. For the sake of uniformity (i. e. in connection with the incoming and the outgoing lines) the connecting circuit in this figure has been split up into two half connecting circuits. At the top of Fig. 4 the connecting lines with other group, minor or star-exchanges have been shown, at the bottom of the figure those with the indicated and other sub, end or dependent exchanges, if any. They always contain an incoming or an outgoing half of a connecting circuit. The registers can again be connected with it in the usual manner.

The connections 11 and 12 which have a vertical course in the secondary trunk line-link-frame indicate the traffic that is handled in tandem, i. e. traffic from sub or end exchanges and group exchanges which is destined for other sub or end exchanges or group exchanges.

Fig. 5 shows the principle of the positioning of the crossbar switches in a system according to the switching diagram of Figs. 2 and 2a.

Fig. 5 shows a number of bridges of crossbar switches from the primary and secondary group of the subscriber's line-link-frame. Between the primary and secondary switches of the subscriber's line-link-frame of a group of 2000 subscribers, there are 400 connecting links which in 10 groups of 40 go to 10 groups of e. g. 10 secondary switches SEC for the outgoing traffic and 10 groups of e. g. 10 secondary switches for the incoming traffic. For each of the 10 groups of secondary switches (bridges) which have been assembled in a number of crossbar switches, a positioning circuit PC has been provided. So per 2000 subscribers with 100 connecting circuits there are 10 positioning circuits. The primary switches belonging to this group of 2000 subscribers can likewise be subdivided in 10 groups, each of which co-operates with a certain group of secondary switches which are served by one positioning circuit PC. One of the sub-groups IV or IV' has been shown in Fig. 5 enclosed by a dashed or dotted line around the switches of the primary and secondary part of the subscriber's line-link-frame associated with its positioning circuit PC. Thus, each group of primary switches PRIM is operated by means of the same positioning circuit as the cooperating group of secondary switches SEC.

This means that when such a positioning circuit PC breaks down, only one tenth of the traffic of a group of 2000 subscribers is affected because one positioning circuit is provided for each corresponding $n$ multiple of links multiplied over all of the link groups, i. e. the first links of each group are multiplied to one positioning circuit PC and the second to another, etc.

A calling subscriber gets access to a register REG in a manner as is usual in the crossbar switch systems. As this poitioning is not related to the invention it need not be described further here. The register sends a dialling tone to the calling subscriber, who selects the four digits, after which the positioning of the required connection is started, e. g. for a group of 2000 subscribers a maximum of 20 registers is provided, which registers in their turn dispose of a maximum of five markers of a simple construction (see W. W. Carpenter Patent 2,093,117, issued September 14, 1937, and assigned to Bell Telephone Labs.). So when a register has received the four digits it seizes a free marker, in which the whole number of the subscriber to be called as well as the number of the calling subscriber (which is announced to the register in the manner usual for crossbar systems) is entered.

The switch MSa belonging individually to a marker and preferably consisting of a number of bridges of a crossbar switch has 40 positions and 10 wipers by means of which access can be had to the busy-indications of all the connecting links between the primary switches and the secondary switches of the subscriber's line-link-frame belonging to the group of 2000 subscribers. Under the control of the number of the called subscriber the switch MS$_A$ is brought into that position in which the 10 engaged indications of the connecting links which serve the group of 50 subscribers in which the calling subscriber occurs, are connected with the marker. Moreover under control of the called subscriber's number there is positioned the switch MS$_B$ having e. g. 5 x 5 positions, 5 positions corresponding with each group of 2000 subscribers. Each of the 5 positions of this switch MS$_B$ (which can also form part of a crossbar switch) belonging to one group, give access to a switch, such as MS$_A$, giving access to the engaged indications of all the connecting links between the primary and the secondary switches of the 2000 unit. So five different markers out of the whole group of markers can survey the engaged position of the connecting links in a 2000 unit. The group of 10 connecting links over which the connection can be set up, are connected to the marker. Furthermore over the switch MS$_C$ there is established a connection between the marker and the engaged indications of the connecting circuits. This switch has 5 positions and 20 wipers. There is, for example, always a group of 20 connecting circuits over which the required connection can be set up. The marker makes a selection from the three groups of 10 (incoming links), 20 (connecting circuits), 10 (outgoing links) possibilities of making the connection, respectively. As a matter of fact this selection is restricted to three free connecting links, which are mutually reachable or available.

Provided the suitable switching means are applied, such a selection can be made by a number of markers simultaneously in the same groups of connecting links. The busy-indications of the connecting links between the primary and the secondary switches can be so arranged that only those can be selected of which the corresponding positioning circuit PC and PC' is free and that the seizure of a connecting link implies the seizure of this positioning circuit. A similar way of switching is known from the normal automatic systems such as e. g. the Antwerp, Belgium Bell Telephone 7 D rotary system.

In principle the device for selecting together the route through the exchange consisting of three connecting links, is the same as the one indicated in the beforementioned description of the No. 1 crossbar system, so this device in the marker (for testing three groups of links and taking the free $n$th one from each group) will not be described further. The testing device shows which of the 10, 20, 10 connecting links respectively is seized or will be used for the connection to be set up. The marker brings the switch MS$_D$ in the position corresponding with the positioning circuit PC belonging to the switches of the subscriber's line-link-frame which correspond with the selected link. Furthermore the switch MS$_E$ is positioned on the positioning circuit PC' of the selected two-thousand, which switches operate the selected connecting link. The positioning circuits can be positioned without further measures because by the selection of the connecting links, they had already been safeguarded from being seized by other markers.

Furthermore to the calling and the called sides, respectively, the marker gives the required positioning information to the primary and secondary switches of the subscriber's line-link-frame. From the positioning circuit PC' and the positioned selecting stages, the marker can be connected to the subscriber's line of the subscriber to be called to make the free test if it had not already been effected along routes outside the selecting stages as it is the case in the No. 1 crossbar system.

When the called subscriber is engaged, busy tone is given through the connecting circuit to the calling subscriber, or it is also possible to throw the connection back on the calling subscriber's line circuit and to send him a busy tone from that circuit. When the called subscriber is free and connected the speech route is switched through via the connecting circuit and a ringing tone is sent to the subscriber to be called.

If many wires are available between marker and positioning circuit, the positioning circuits PC and PC' need in principle only contain the magnets of the crossbar switches to be operated. This number of wires can be restricted appreciably by applying some relays in the positioning circuits such as shown in copending Oberman application Serial No. 316,573.

The switching structure designed is not complete because the subscribers' numbers disposing of more than one line (so-called "group-numbers" or P. B. X numbers) cannot be dealt with in this manner. As a matter of fact the access to the next line of such a subscriber's number, which preferably must be established in another 50 in connection with the distribution of the traffic (particularly if no non-decimal system combined with conversion is applied, as it has been designed in the crossbar systems of the Western Electric Co.), will have to be gained via quite another route through the exchange, therefore it will not be sufficient to operate switches in the speech route repeatedly.

It will therefore be necessary to add a device to the marker such as for example shown in the Carpenter patent above cited to test group-lines so that the marker before positioning a connection ascertains which line of a group-number will be seized. To maintain the simplicity of the system and in view of the space available in the crossbar switches, it will be assumed that 20% of the available numbering capacity can be adapted to group-numbers.

Figs. 6 and 6$a$ by way of example shows the switching diagram of an exchange for 2000 lines with the schematic representation of the coupling of a register REG and a marker with the different switching stages. Figs. 6 and 6$a$ are an elaboration of Fig. 5 also representing an additional independent exchange with 10,000 lines. The switching diagram of Figs. 6 and 6$a$ has a trunk line-link-frame for the traffic to the two ten-thousandth units. Such a frame is, however, not strictly necessary. To indicate that the applied symbols representing selectors or finders, can always be interexchanged in systems with cross-bar switches, the crossbar switches of the trunk line-link-frame in Figs. 6 and 6$a$ have been drawn as selectors enclosed in dash or dotted lines within the vertical parallel dash or dotted lines outlining the frames themselves.

The marker can test by means of the switch MS$_A$, the busy-position of all the connecting links which the calling subscriber has available, while the connecting links over which the connection with the called subscriber will be established is tested via arc $b$ of the crossbar switch MS$_B$ (Fig. 6) and one of the switches MS$_G$. The busy-position of the connecting circuits via which the connection will be set up and the one of the trunk connecting links are tested via the switch MS$_D$ and arc $a$ of switch MS$_B$, respectively. Now the marker must select together four successive free and mutually reachable links. Via the switch MS$_E$ the positioning information is given to the positioning circuit opertaing the switches in the subscriber's line-link-frame over which the indicated links find their course. Via MS$_F$ arcs $a$ and $b$ the information on the indicated trunk connecting link and the required positioning of the subscriber's line-link-frame for the subscriber to be called is given to the relevant positioning circuits. In Figs. 6 and 6$a$ the bridges of crossbar switches belonging to one positioning circuit have been surrounded with a dash-dotted line IV or IV'.

The foregoing figures show switching diagrams in which the connection from subscriber to subscriber, in case of a call in the exchange itself, is effected under the control of detour devices by selecting together a number of successive connecting links wherein the calling and the called subscriber are the fixed points. For a four-digit system, which has served as example of the invention, 50-outlet, 40, 40, and 50-outlet switching units were applied successively (see Fig. 2). Some variations were given for a 5 to 6-digit system, these switching units being applied too. For this purpose more than three (namely four) connecting links were required. Such a 5 to 6-digit system, as given in the examples, can also be equipped with three connecting links if only switching units with more positions are applied. The invention comprises, however, all these variations of the given principle.

The question might be asked what solution has to be adopted for the switching system with the smallest total number of contact elements. This is especially of importance to the electronical switching system equipped according to a switching diagram in accordance with the invention, rectifying cells being applied as contacts in the speech routes. In general it can be said that a system requires a minimum number of contact material if it has been constructed with the switching units with the smallest number of positions. (For a practically elaborated example see Rochester, Proceedings Inst. of Radio Engineers, 1949, No. 2, pages 139–147.)

Therefore it is interesting to consider what the switching diagram according to the invention will be like when the smallest switching units of a crossbar switch, namely the 10-outlet bridge, are applied. In Fig. 7 such a diagram has been drawn for a traffic of an order of magnitude equalling the one for which the other diagrams were drawn i. e. 10,000 line exchange.

The diagram shows a subscriber's line-link-frame with primary and secondary switches with ten positions. As shown in the diagram these switches together give access to 100 subscribers. Each unit of ten has four outlets. The outgoing and the incoming traffic of such a group is split up on the secondary switches. Splitting up into groups for certain units of thousand is not yet possible on this link-frame in connection with the small number of switches in one group.

Furthermore Fig. 7 contains primary and secondary switches of a connecting circuit link-frame, which actually has the function of the secondary switches of the subscriber's line-link-frame of the Figures 1 and 2. The 100 connecting circuits serving a group of 1000 subscribers have been subdivided into ten groups of 10 in accordance with the various units of thousand. If required from a traffic point of view, larger groups can be formed by adding connecting circuits.

So the connecting circuit links between the switches of the subscriber's line-link-frame have been split up per unit of hundred into two groups of 10 outgoing and incoming connecting links of the connecting circuit link-frame respectively. The connecting circuits of 10,000 subscribers in Fig. 7 have been subdivided into 10 groups of 100, which results in 1000 connecting circuits per 10,000 subscribers. This number can be limited again by applying the measures taken in Figs. 2 and 2a to improve Figs. 1 and 1a. Then the switches of the connecting circuit link-frame will be 10-outlet without an increase of the total number if a total number of 500 connecting circuits are provided. The subscribers are divided into groups of 2000.

The number of ten point bridges of crossbar switches required per 1000 subscribers in Fig. 7, amounts to 800, while according to Figs. 1 and 1a a number of 1400 of these ten-outlet bridges is required.

While I have illustrated and described what I regard to be the preferred embodiment of my invention, nevertheless it will be understood that such is merely exemplary and that numerous modifications and re-arrangements may be made therein without departing from the essence of the invention, I claim:

1. In an automatic switching system between a plurality of terminals wherein any one terminal can be connected to any other terminal in the system, said system having a primary selecting stage and a secondary selecting stage, each stage comprisnig a plurality of incoming and outgoing selector switches, said terminals being connected to said primary switches, link circuits being connected between said primary and said secondary switches, circuits connecting said incoming and said outgoing secondary switches, and register circuits being connectable to said secondary switches; the improvement comprising: a plurality of marker circuits, means for connecting any one of said marker circuits to any one of said connecting circuits and said register circuits, and positioning circuits associated with each said marker circuit being connectable to said link circuits, whereby said marker and said positioning circuits test and busy the necessary available and free link and connecting circuits required to make a connection between two given terminals, and simultaneously position said primary and secondary switches to connect said tested and available preselected free link and connecting circuit to establish the connection between said two given terminals.

2. The system according to claim 1 wherein said selector switches include switches of the crossbar type.

3. The system according to claim 1 wherein said incoming and outgoing switches are divided into numerical groups.

4. The system according to claim 1 wherein said connecting circuits are divided into numerical groups.

5. The system according to claim 1 wherein said terminals correspond to subscribers' lines, each corresponding to a different four digit number, and containing two link circuits and one connecting circuit in series in each connection between two given subscribers' terminals.

6. The system according to claim 1 for a five and six digit numbers of terminals including an additional single secondary selecting stage of switches connected to said connecting circuits.

7. In an automatic switching system between a plurality of terminals wherein any one termnial can be connected to any other terminal in the system, said system comprising: a terminal link frame having at least a primary selecting stage and a secondary selecting stage, each stage having a plurality of incoming and outgoing multi-contact selector switches, circuits connecting said incoming and outgoing secondary selecting stage switches, incoming and outgoing link circuits connected between said primary and said secondary stage switches, means for connecting siad terminals to said primary switches, a plurality of marker circuits, means for connecting any one of said marker circuits to any one of said link circuits and any one of said connecting circuits between any two of said terminals, whereby a free circuit may be selected from one of said terminals to the other in series through one of said connecting circuits and its available and connectable incoming and outgoing link circuits, and means to position the switches in said selecting stages simultaneously to connect said free circuit entirely under the control of said marker circuit.

8. The system according to claim 7 wherein said terminal link frame includes one group of primary switches and two groups of secondary switches.

9. The system according to claim 7 wherein said multi-contact selector switches include crossbar switches.

10. The system according to claim 7 including means in said marker circuit for busying said selected connecting and link circuits until said free circuit is completely connected between said two of said terminals.

11. The system according to claim 7 wherein said positioning means includes one positioning circuit for said incoming switches and another positioning circuit for said outgoing switches.

12. The system according to claim 11 wherein said two positioning circuits are associated with each marker circuit.

13. The system according to claim 7 wherein said register, marker and positioning means are operated to select available and free link and cord circuits between two given terminals before said selecting switches connect said selected link and connecting circuits to said two terminals.

References Cited in the file of this patent

UNITED STATES PATENTS

| | | |
|---|---|---|
| 1,845,604 | Johnson | Feb. 16, 1932 |
| 1,851,482 | Baker | Mar. 27, 1932 |
| 2,093,117 | Carpenter | Sept. 14, 1937 |
| 2,582,959 | Bruce | Jan. 22, 1952 |